(12) United States Patent
Oxley et al.

(10) Patent No.: US 7,940,165 B1
(45) Date of Patent: May 10, 2011

(54) LOW FUEL WARNING SYSTEMS FOR A MOTORIZED VEHICLE

(75) Inventors: Lonnie R. Oxley, Versailles, KY (US); Darrell E. Helton, Berea, KY (US); David S. Billings, Berea, KY (US); Ashwani K. Bansal, Greenville, NC (US); Jeffrey G. Stephenson, Nicholasville, KY (US)

(73) Assignee: NMHG Oregon, LLC, Portland, OR (US)

( * ) Notice: Subject to any disclaimer, the term of this patent is extended or adjusted under 35 U.S.C. 154(b) by 412 days.

(21) Appl. No.: 11/842,923

(22) Filed: Aug. 21, 2007

Related U.S. Application Data

(60) Provisional application No. 60/839,213, filed on Aug. 21, 2006.

(51) Int. Cl.
*B60Q 1/00* (2006.01)

(52) U.S. Cl. ............ 340/450.2; 340/450; 340/438

(58) Field of Classification Search .......... 340/450, 340/450.2, 450.3, 612, 613, 603, 614, 615, 340/618, 438; 73/290 R
See application file for complete search history.

(56) References Cited

U.S. PATENT DOCUMENTS

| | | | |
|---|---|---|---|
| 2,807,976 A | 10/1957 | Vossberg | |
| 2,811,128 A | 10/1957 | Franck | 116/276 |
| 3,766,395 A | 10/1973 | Keir | |
| 3,832,900 A | 9/1974 | Ross | 73/290 R |
| 3,926,230 A * | 12/1975 | Stary et al. | 141/45 |
| 3,949,360 A | 4/1976 | Pignata et al. | 340/450.3 |
| 4,037,967 A | 7/1977 | Schweizer et al. | |
| 4,084,547 A | 4/1978 | Deziel | 122/504 |
| 4,167,002 A * | 9/1979 | Foley | 340/450.2 |
| 4,167,874 A | 9/1979 | Grant | 73/290 R |
| 4,245,290 A | 1/1981 | Lipman | |
| 4,250,750 A | 2/1981 | Martinec et al. | |
| 4,292,620 A | 9/1981 | Pagane | 180/287 |
| 4,306,805 A | 12/1981 | Arrington | |
| 4,372,165 A | 2/1983 | Pitt et al. | |
| 4,402,048 A | 8/1983 | Tsuchida et al. | 701/123 |
| 4,427,293 A | 1/1984 | Harmer | |
| 4,437,162 A * | 3/1984 | Kato | 701/123 |
| 4,589,281 A | 5/1986 | Aldrich | 73/290 R |
| 4,699,511 A | 10/1987 | Seaver | |
| 4,734,682 A * | 3/1988 | Bond, Jr. | 340/614 |
| 4,773,260 A | 9/1988 | Ohno et al. | 73/114.54 |
| 4,811,601 A | 3/1989 | Tolan | 73/290 B |
| 4,907,878 A | 3/1990 | Arditty et al. | |
| 5,010,868 A * | 4/1991 | Clements | 123/527 |
| 5,083,018 A | 1/1992 | Rhyne | |
| 5,103,672 A * | 4/1992 | Terry et al. | 73/304 C |
| 5,159,313 A * | 10/1992 | Kawai et al. | 340/450.3 |
| 5,357,241 A * | 10/1994 | Welch et al. | 340/605 |
| 5,386,111 A | 1/1995 | Zimmerman | |
| 5,452,076 A | 9/1995 | Schopper et al. | |
| 5,563,584 A * | 10/1996 | Rader et al. | 340/618 |

(Continued)

*Primary Examiner* — Daniel Wu
*Assistant Examiner* — Rufus Point
(74) *Attorney, Agent, or Firm* — Stolowitz Ford Cowger LLP (57) ABSTRACT

The low fuel warning system includes a fuel line configured to transport fuel between an inlet port and an outlet port and a reservoir located intermediate to the inlet port and the outlet port, wherein the reservoir is configured to collect the fuel in a liquid state. The low fuel warning system further includes a fuel sensor located adjacent the reservoir and configured to detect the liquid state of the fuel and a processor in communication with the fuel sensor. The processor is configured to monitor a low fuel condition in the fuel line according to information received from the fuel sensor.

28 Claims, 9 Drawing Sheets

U.S. PATENT DOCUMENTS

| | | | |
|---|---|---|---|
| 5,595,163 A * | 1/1997 | Nogi et al. | 123/494 |
| 5,623,252 A * | 4/1997 | Cacciola et al. | 340/618 |
| 5,670,831 A * | 9/1997 | Georgiades | 307/10.3 |
| 5,831,536 A * | 11/1998 | Zager | 340/623 |
| 5,867,089 A * | 2/1999 | Zyburt et al. | 340/323 R |
| 5,881,207 A * | 3/1999 | DeBourg et al. | 392/401 |
| 5,886,625 A * | 3/1999 | Uto et al. | 340/450.2 |
| 5,887,479 A * | 3/1999 | Swanson | 73/290 R |
| 5,942,980 A * | 8/1999 | Hoben et al. | 340/618 |
| 5,975,574 A | 11/1999 | Warth | |
| 6,002,328 A * | 12/1999 | Wallrafen | 340/450.2 |
| 6,109,225 A * | 8/2000 | Ogita et al. | 123/90.15 |
| 6,124,794 A * | 9/2000 | Furber et al. | 340/623 |
| 6,252,499 B1 * | 6/2001 | Gerdtz et al. | 340/450.2 |
| 6,279,612 B1 | 8/2001 | Warth | |
| 6,314,947 B1 * | 11/2001 | Roche | 123/525 |
| 6,408,692 B1 * | 6/2002 | Glahn | 73/313 |
| 6,532,813 B1 * | 3/2003 | Pauer | 73/290 R |
| 6,668,645 B1 * | 12/2003 | Gilmour et al. | 73/290 R |
| 6,766,269 B2 * | 7/2004 | Lee | 702/136 |
| 6,789,420 B2 * | 9/2004 | Larson et al. | 73/295 |
| 6,819,250 B2 * | 11/2004 | Nishioka | 340/608 |
| 6,885,306 B2 * | 4/2005 | Holzman et al. | 340/606 |
| 7,117,904 B2 * | 10/2006 | Strasser | 141/95 |
| 7,195,055 B1 * | 3/2007 | Jaeger | 165/51 |
| 7,199,388 B2 * | 4/2007 | Omatoi | 250/573 |
| 2002/0118025 A1 * | 8/2002 | Yamagishi et al. | 324/672 |
| 2003/0020494 A1 * | 1/2003 | Desmier et al. | 324/667 |
| 2003/0170075 A1 * | 9/2003 | Strassman | 404/95 |
| 2004/0069694 A1 * | 4/2004 | Gamble et al. | 210/85 |
| 2005/0040958 A1 * | 2/2005 | Holzman et al. | 340/612 |
| 2005/0166972 A1 | 8/2005 | Casier | |
| 2006/0000279 A1 * | 1/2006 | Jamnia et al. | 73/313 |
| 2007/0157908 A1 * | 7/2007 | Kano et al. | 123/520 |
| 2007/0234796 A1 * | 10/2007 | Tshishiku | 73/290 R |
| 2008/0218363 A1 * | 9/2008 | Howayshell | 340/612 |
| 2009/0036248 A1 * | 2/2009 | Mueller et al. | 475/72 |

* cited by examiner

| X1 RUN TIME* | Y1 TANK PRESSURE (PSI) | Y2 60 PSI SWITCH | Y4 32 PSI SWITCH | Y3 40 PSI SWITCH | TEMP F |
|---|---|---|---|---|---|
| 0 | 6.8 | 36 | 8 | 18 | -30 |
| 0 | 11.5 | 36 | 8 | 18 | -20 |
| 1 | 17.5 | 36 | 8 | 18 | -10 |
| 1 | 24.5 | 36 | 8 | 18 | 0 |
| 2 | 34 | 36 | 8 | 18 | 10 |
| 3 | 42 | 36 | 8 | 18 | 20 |
| 3 | 53 | 36 | 8 | 18 | 30 |
| 4 | 65 | 36 | 8 | 18 | 40 |
| 5 | 78 | 36 | 8 | 18 | 50 |
| 6 | 93 | | | | 60 |
| 7 | 110 | | | | 70 |
| 8 | 128 | | | | 80 |
| 10 | 150 | | | | 90 |
| 11 | 177 | | | | 100 |
| 13 | 204 | | | | 110 |

LOW FUEL WARNING SYSTEMS FOR A MOTORIZED VEHICLE

This application claims priority to U.S. Provisional Patent Application 60/839,213 filed on Aug. 21, 2006, which is herein incorporated by reference in its entirety.

BACKGROUND

Industrial vehicles such as forklift trucks, man-lifts and sweepers, may utilize liquid propane (LP) engines to provide vehicle traction, hydraulics and other functions. LP fuel, while typically provided as a liquid under pressure of a fuel tank, becomes substantially vapor by volume as the fuel is used up. Fuel level sensors that rely on fuel level in an LP tank, or on tank pressure, provide for an insufficient amount of warning time as the tank is nearing empty. Vehicle operators complain the low LP fuel warning light and/or audible alarm does not come on soon enough to provide adequate time to reach a refueling station or complete a task. Under some circumstances, the warning light comes on and the liquid propane gas engine stalls shortly or immediately thereafter from lack of adequate fuel. The pressure at which liquid LP turns to vapor in the tank varies under different operating conditions, not least of which is an ambient temperature.

One challenge with LP fuel level sensing on LP engine powered systems is caused by the fact that most are refueled by exchanging fuel tanks. Incorporating a fuel level sensor gauge that is visible to the operator in all these exchange tank applications is expensive. Such fuel level sensor gauges require additional electrical connections (e.g. for the truck dash display) when exchanging fuel tanks and result in reliability problems.

A pressure switch based low LP fuel warning system includes a pressure switch in the fuel supply line and an indicator light on the dash and/or audible alarm. The switch generally activates when the fuel system pressure drops below some threshold, resulting in a short warning to the operator. However, during cold weather applications of 35 degrees Fahrenheit or lower, the propane vapor pressure may be lower than the threshold even if the tank is full. This means the low fuel indicator light will stay on even if the tank is full. Additionally, pressure switch based low LP fuel warning systems include moving parts which tend to fail or require servicing over time.

On some conventional low fuel warning systems, if the tank on the vehicle runs out of liquid fuel, the gauge will still show a partial fuel level. The low fuel warning will only come on when the vapor pressure is low enough to activate the pressure switch. The operator, who planned on working with half a tank of fuel is suddenly left without any vehicle power. Down time caused by the truck being stranded when running out of fuel, or leaving a task partially finished due to low fuel, costs money. It also contributes to service calls to the service department.

The energy content of liquid fuel in a given volume is slightly affected by temperature. However, fuel energy content of fuel vapor is significantly dependant upon temperature. Equivalent energy content of liquid propane gas is 270 times more than propane vapor.

Therefore a small volume of liquid propane gas has more energy content than a large tank of propane vapor. Conventional low fuel warning designs rely on a vapor volume reserve. If a tank is full of propane vapor, it does not have much energy content to run a truck, especially in cold weather.

Conventional low fuel warning systems normally depend upon decreasing vapor pressure to activate a pressure switch that turns on a warning light or an audible alarm. Depending on the ambient temperature, fuel consumption rate, the tank size, and pressure switch setting, the run-time after a low fuel warning light illuminates is approximately two to four minutes. If the truck is operated in very low temperature conditions, the propane vapor pressure can be so low that the low fuel warning light stays on all the time.

The present invention addresses these and other problems.

SUMMARY OF THE INVENTION

A fuel sensor for detecting a low fuel condition in a motorized vehicle is herein disclosed. The fuel sensor includes an effective signal path configured to detect a fuel, and a fuel reservoir configured to be connected to a fuel line. The fuel sensor further includes a housing containing the effective fuel path that is located adjacent the fuel reservoir. The fuel reservoir is configured to trap the fuel in a liquid phase as it is being transmitted through a fuel line and past the housing for detection by the effective signal path.

A low fuel warning system of a motorized vehicle is herein disclosed. The low fuel warning system includes a fuel line configured to transport fuel between an inlet port and an outlet port and a reservoir located intermediate to the inlet port and the outlet port, wherein the reservoir is configured to collect the fuel in a liquid state. The low fuel warning system further includes a fuel sensor located adjacent the reservoir and configured to detect the liquid state of the fuel and a processor in communication with the fuel sensor. The processor is configured to monitor a low fuel condition in the fuel line according to information received from the fuel sensor.

A method of monitoring a low fuel condition in a motorized vehicle is herein disclosed, including receiving signals from a fuel sensor, determining a number of the signals received from the fuel sensor, and identifying the low fuel condition when the number of received signals exceeds a threshold value. The method further includes alerting a vehicle operator of the low fuel condition and commanding a low fuel mode of operation of the motorized vehicle.

DETAILED DESCRIPTION

Figure 1:
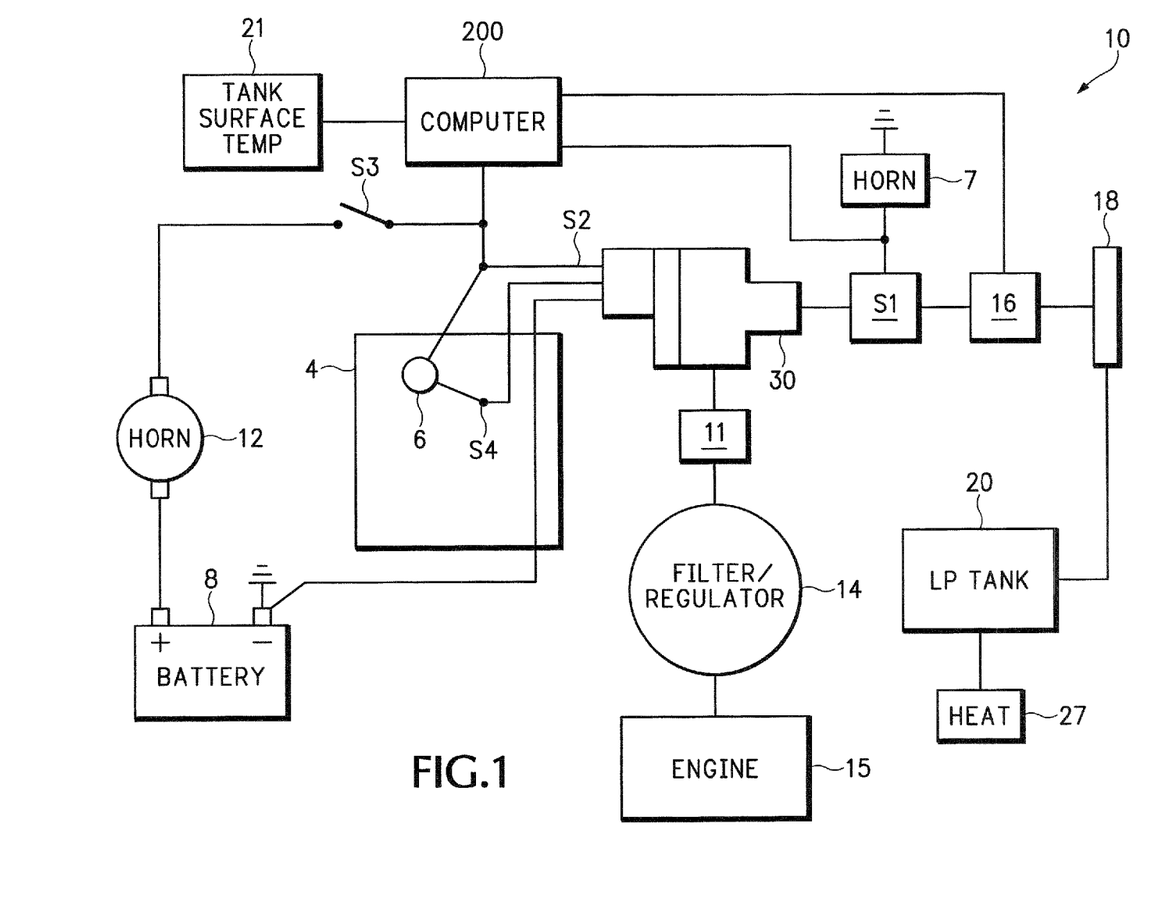
FIG. 1 illustrates a low fuel warning system for a motorized vehicle.

FIG. 1 illustrates a low fuel warning system 10 for a motorized vehicle (not shown). The low fuel warning system 10 may include a liquid draw type liquid propane (LP) fuel system including a fuel sensor 30 that is configured to detect the presence of liquid, vapor, or any phase combination of propane in a pipe, fuel supply line, or container. The low fuel warning system 10 is illustrated as showing components connected by lines, however these lines are provided for illustrative purposes only, and may be understood to represent fuel lines, electrical connections, or communication between components.

The low fuel warning system 10 may be incorporated in an engine management system that is controlled by an on-board computer, processor or controller 200. The controller 200 may receive input from a pressure transducer 16, a tank temperature sensor 21, the fuel sensor 30, and various other components of the engine management system. The controller 200 may provide input to, or control, a vehicle horn 12, a low fuel indicator 6, an engine 15, etc.

Various switches may be provided that are under control of the controller 200 or that are pressure activated. A pressure switch S1 is shown connected intermediate the fuel sensor 30 and the pressure transducer 16. A sight glass 18 may be provided near the fuel tank 20, for example, to make visible the fuel in the fuel line during testing. Otherwise, the sight glass 18 is not typically provided in the low fuel warning system 10. A sensor output switch S2 is shown intermediate to the fuel sensor 30 and the controller 200. Toggle switch S3 is shown intermediate a horn 12 and the controller 200. An audible alarm 7 may provide a warning of a low fuel condition, including a final warning of imminent fuel exhaustion. The low fuel indicator 6 and/or the audible alarm 7 may be contained in a sensor indicator light box 4. The low fuel indicator 6 is shown as including a switch S4. The low fuel warning system 10 may include pressure or temperature sensing switches and sensors which may be configured to trigger additional warnings after the low fuel indicator 6 is first activated, and before the fuel tank 20 runs out of fuel.

The battery 8 may provide power to the horn 12 and the sensor indicator light box 4, as well as other electrical components in the low fuel warning system 10, such as the controller 200. A filter/regulator 14 is shown connected to the fuel line between the engine 15 and an LP lockoff 11. The fuel tank 20 may include a tank heater 27, that is configured to operate according to changes in ambient temperature, fuel temperature, fuel pressure, fuel level, or various other operating parameters.

The low fuel warning system 10 may include a low fuel indicator 6 (e.g. a light and/or an alarm) to make a vehicle operator aware of a low fuel condition. The low fuel warning system 10 may utilize the LP lockoff 11 to initiate a low fuel mode of operation to prevent the starter motor operating with no fuel to the engine leading to starter motor overheating and battery 8 discharge and/or to limit engine rpm. The multiple restart practice is a common occurrence in some operations, that otherwise may use the starter motor to get the vehicle to move after the vehicle runs out of LP fuel.

The fuel sensor 30 may incorporate a filtered output signal to prevent a flickering or intermittent notification of the low fuel indicator 6 resulting from an instantaneous vapor reading. This may be accomplished by programmable output signal logic. In one embodiment a microprocessor is incorporated into the fuel sensor 30, whereas the fuel sensor 30 may be controlled by the controller 200 in some applications or other embodiments. The low fuel indicator 6 may be provided in a dash display of the vehicle. In one embodiment, an aftermarket configuration vapor sensor based low fuel warning system may be implemented which incorporates it's own warning light and/or audible alarm to ensure functional compatibility on all forklifts or other LP engine powered vehicles or equipment.

Figure 2A:
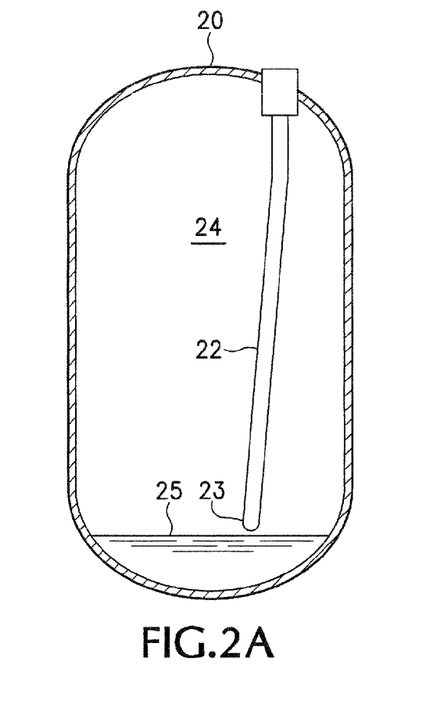
FIG. 2A illustrates an example fuel tank maintained in a vertical orientation.

FIG. 2A illustrates an example fuel tank 20 maintained in a vertical orientation. The fuel tank 20 may be an exchangeable LP fuel tank including an internal fuel supply tube 22. The low fuel warning system 10 of FIG. 1 may take advantage of the liquid fuel 25 under the fuel tank's fuel supply tube inlet 23, as well as the pressurized propane vapor 24 in the tank 20, which combine to serve as an internal low fuel reservoir supply. This liquid fuel 25 may provide a minimal reserve operational time regardless of ambient or operating temperature. The LP fuel system typically starts running on vapor when the liquid fuel level 25 drops below the fuel supply tube inlet 23, and the liquid fuel 25 is subsequently converted to propane vapor 24.

Figure 2B:
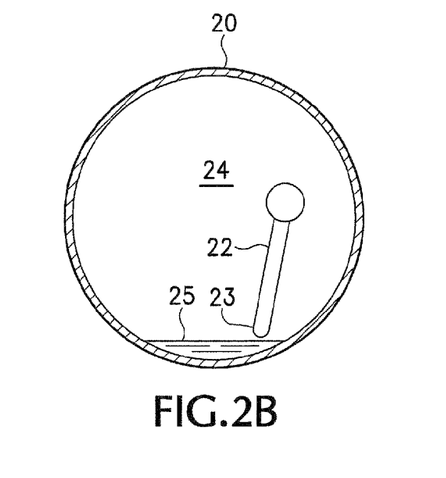
FIG. 2B illustrates the example fuel tank of FIG. 2A maintained in a horizontal orientation.

FIG. 2B illustrates the example fuel tank 20 of FIG. 2A maintained in a horizontal orientation. A pool of the liquid fuel 25 is shown located beneath the fuel supply tube inlet 23 of the internal fuel supply tube 22, similarly as described with reference to FIG. 2A.

The low fuel warning system 10, including the fuel sensor 30, may provide additional low fuel warning time after the liquid fuel 25 is no longer in the fuel line 35. Fuel from this reservoir of pressurized vapor 24 inside the fuel tank 20 can result in additional low fuel warning time. Warmer weather can increase the tank vapor pressure and result in a longer run time after liquid fuel 25 runs out.

Figures 3A, 3B:
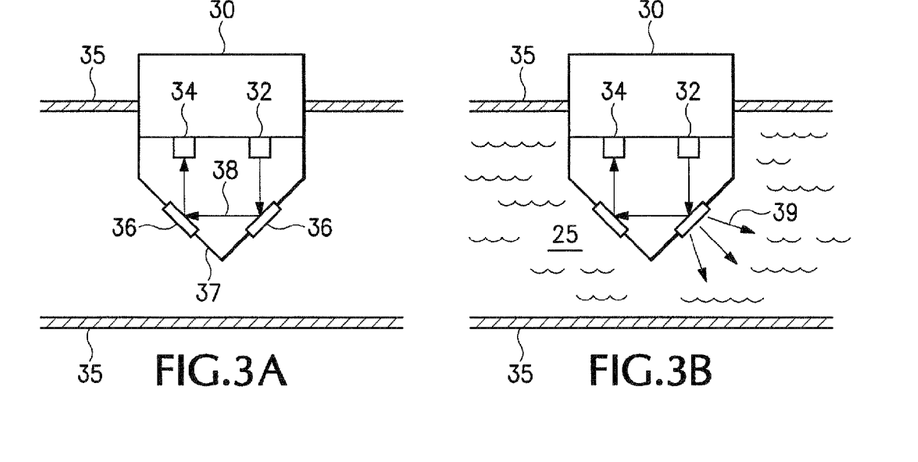
FIG. 3A is a simplified view of a fuel sensor.
FIG. 3B illustrates the fuel sensor of FIG. 3A immersed in a liquid.

FIG. 3A is a simplified view of a fuel sensor 30. In one embodiment the fuel sensor 30 includes optic refraction sensor technology. The fuel sensor 30 is illustrated as being mounted in a fuel line 35. The fuel sensor 30 may include an emitter 32 and a receiver 34, and in one embodiment does not include any moving parts. This may increase reliability of the fuel sensor 30 as well as the low fuel warning system 10. The emitter 32 may be configured to transmit a signal 38, whereas the receiver may be configured to receive or identify the signal 38. The signal 38 may form a light path within the fuel sensor, such as within a sensor cone 37. The sensor cone may include one or more lens 36. When the fuel sensor 30 is immersed in a vapor or gas, the signal 38 is reflected by the lens 36 such that the signal remains inside of the sensor cone 37, essentially at full strength.

FIG. 3B illustrates the fuel sensor 30 of FIG. 3A immersed in a liquid such as liquid fuel 25. Some of the signal 38 may be absorbed by, or refracted into, the liquid fuel 25 that is in contact with the lens 36, such that the signal 38 that is received by the receiver 34 is less strong as compared to the fuel sensor 30 illustrated in FIG. 3A. A refracted signal 39 that is emitted into the liquid fuel 25 may therefore not be received by the receiver 34. In one embodiment, the receiver 34 identifies a liquid, vapor, or combined liquid and vapor (i.e. two phase) state of the LP fuel in the fuel line 35 according to the strength of the received signal 38.

Figure 9:
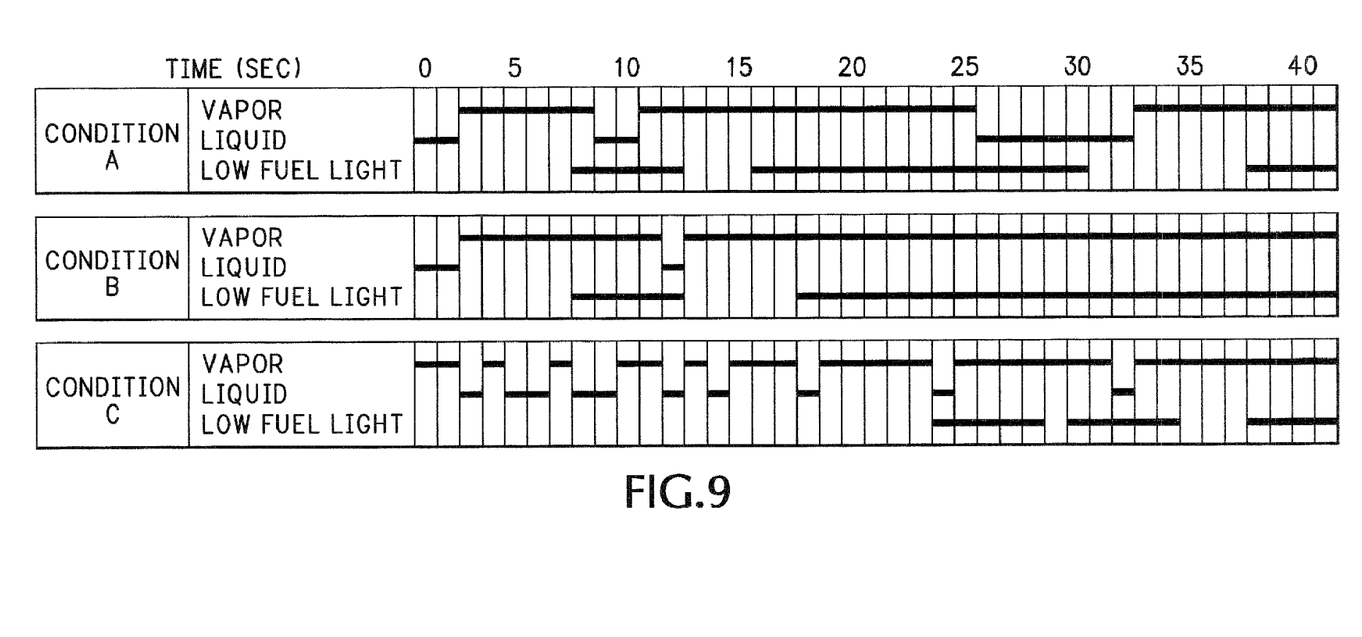
FIG. 9 illustrates an algorithm for detecting a low fuel condition.

While the fuel sensor 30 may be configured to detect the difference between liquid and vapor propane, in some cases this may result in a flickering indicator light condition due to irregular flow of LP fuel in the fuel line 35. The irregular flow of LP fuel may result from varying demands of the engine 15 (FIG. 1), for example idle versus full throttle operating conditions, as well as vapor pockets that may form in the fuel line 35. A microprocessor or controller, such as the controller 200 of FIG. 1, may be configured to filter the signal 38 via a light activation logic sequence. The light activation logic sequence is illustrated in FIG. 9, and described in detail, further herein.

Figure 4:
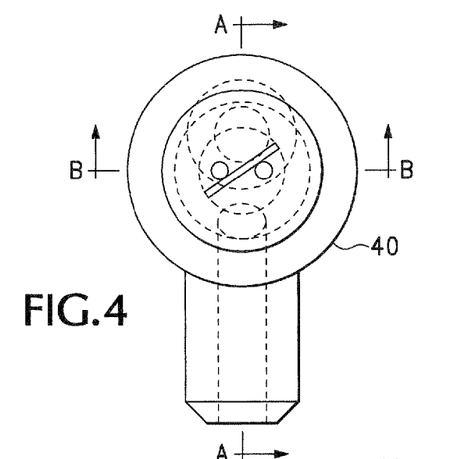
FIG. 4 illustrates a plan view of a sensor housing.

FIG. 4 illustrates a plan view of a sensor housing 40. The sensor housing may be attached to the fuel line 35 (FIG. 3A, 3B). A first cross section of the sensor housing 40 is shown taken with respect to axis A-A and further illustrated in FIG. 4A. A second cross section of the sensor housing 40 is shown taken with respect to axis B-B and further illustrated in FIG. 4B.

Figure 4A:
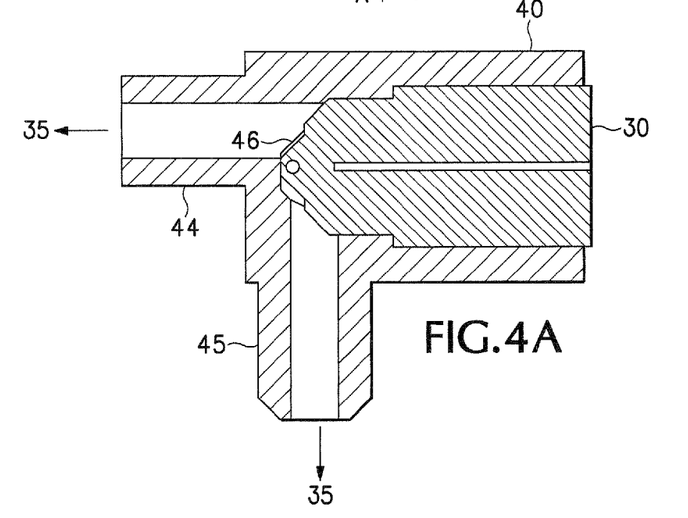
FIG. 4A illustrates a first cross-sectional view of the sensor housing.

FIG. 4A illustrates the first cross-sectional view of the sensor housing 40 including the fuel sensor 30. The housing 40 may be attached or connected to the fuel line 35. The housing 40 may include or be connected to a first port 44 and a second port 45 of the fuel line 35. In one embodiment, the first port 44 is configured in an approximately horizontal orientation, whereas the second port 45 is oriented in an approximately vertical orientation. In one embodiment, the first port 44 is an outlet port and the second port 45 is an inlet port.

Figure 4B:
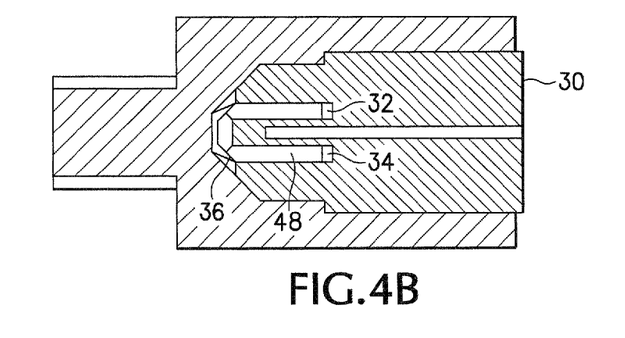
FIG. 4B illustrates a second cross sectional view of the sensor housing.

FIG. 4B illustrates a second cross sectional view of the sensor housing 40, including the emitter 32 and the receiver 34. The effective signal path 48 of the fuel sensor 30 may identify a path of the signal 38 of FIG. 3A. A restrictive gap 46 (FIG. 4A) may be provided between the lens 36 and the housing 40 to facilitate contact of any amount of liquid fuel to contact the effective signal path 48, for example during a low fuel flow situation. By restricting the flow of fuel past a sensitive part of the lens 36, this helps to avoid generating erroneous vapor signals that may otherwise occur if the lens 36 is instead in contact with vapor. In one embodiment, this can be accomplished by locating the lens 36 close to the housing 40.

The restrictive gap 46 may be big enough to allow debris to pass through and not cause excess flow restriction to the LP fuel. The restrictive gap 46 may be small enough to ensure liquid fuel contacts the lens 36 in a low flow situation. In one embodiment, the restrictive gap 46 is approximately 0.05 inches. The size of the restrictive gap 46 may depend upon the location of the sensor's detection zones or effective signal path 48. Flattening the tip of the lens 36 and minimizing the housing clearance from the lens surface may provide an ability to further control the amount of fuel flow which goes through this sensitive cross section area. This may allow the fuel to flow past the sides of the lens 36 in regions where the signals 38 or effective signal path 48 exist.

The restrictive gap 46 (FIG. 4A) or restriction zone located between the sensor housing 40 and the lens 36 results in any residual fuel droplets clearing off from the lens 36 sooner when the fuel supply changes from a liquid to a vapor. High velocity propane vapor blows past the lens 36 in this restrictive gap 46 causing the residual fuel droplets to move downstream. This reduces the chance of the fuel sensor 30 producing an erroneous output due to residual liquid fuel droplets remaining on the lens 36.

Intermittent fuel flow intervals that can occur during idle conditions can vary from constant flow out of the fuel tank 20 to no flow for a few seconds depending upon engine size and tank configuration. A predictable liquid volumetric siphon effect of a 100% fluid column from the fuel tank 20 to the engine 15 may not exist due to the generation of vapor bubbles & vapor pockets within the fuel line 35. Instead, during idle conditions with a full or partially full tank 20, the fuel tank 20 "burps" out liquid fuel in seemingly random time intervals as described above. To compensate for this, a sensor sampling time interval can be programmed to be a bit longer than the longest "burp" interval for the application. Other methods such as locating the sensor lens 36 in a liquid fuel reservoir inside the fuel sensor 30 or the fuel line 35 may also be used to address the intermittent flow issue, as described further herein. In one embodiment, the fuel sensor 30 is located near or at the vaporizer 110 (FIG. 10) to identify a lower liquid flow.

By configuring the port 44 in a substantially horizontal orientation and the port 45 in a substantially vertical orientation, false vapor readings may be avoided. Liquid fuel may be allowed to drain into the port 45, whereas vapor may be vented around the lens 36 and out the port 44.

The location of the emitter 32 and receiver 34 (FIG. 3) may be oriented such that the effective signal path 48 (FIG. 4B) resides at the sides of the lens 36 where the maximum flow restriction occurs. The effective signal path 48 may be located above or below the reservoir 50. In one embodiment, the beam plane is approximately perpendicular to the axes of the inlet and outlet ports 45, 44. This ensures liquid fuel 25 contacts the sensitive part of the lens 36 instead of bypassing it.

The housing 40 and sensor lens 36 may be arranged such that any liquid droplet would drain out and any vapor bubble would vent instead of being trapped, causing erroneous signals. This may be accomplished by offsetting the downstream port axis from the lens axis. Increasing the bore size of the inlet and outlet ports 45, 44 may also extend the inner diameter of the fuel line 35 to the edges of the reservoir 50 located between the lens 36 and the housing 40.

Liquid fuel flow may be very low and intermittent during idle conditions. In some cases liquid fuel 25 trickles through the bottom of the fuel line 35 when a large vapor pocket exists in the fuel line 35. Fuel sensor performance can also be affected by the location of the fuel sensor 30. Sometimes there are vapor pockets in the higher and more vertical sections of the fuel supply line 35. Also, the amount of vapor in the fuel may increase near the vaporizer 110 (FIG. 10) or other hot supply line components which cause vapor bubbles to form. In one embodiment, the fuel sensor 30 is located in a low part of the fuel line 35 away from hot supply line components.

The fuel sensor 30 and housing 40 may include a 1/4NPT pipe fitting and/or SAE 45 plumbing connection, for example, that can be arranged to be straight or at an angle (e.g. between 45 degrees and 90 degrees). The lens 36 may provide a predetermined angle of refraction according to the type of fuel, such as LP fuel, that comes into contact with the lens 36. The sensor housing 40 may be made of brass, zinc, aluminum or other material which is non-reactive with the fuel.

Figure 5:
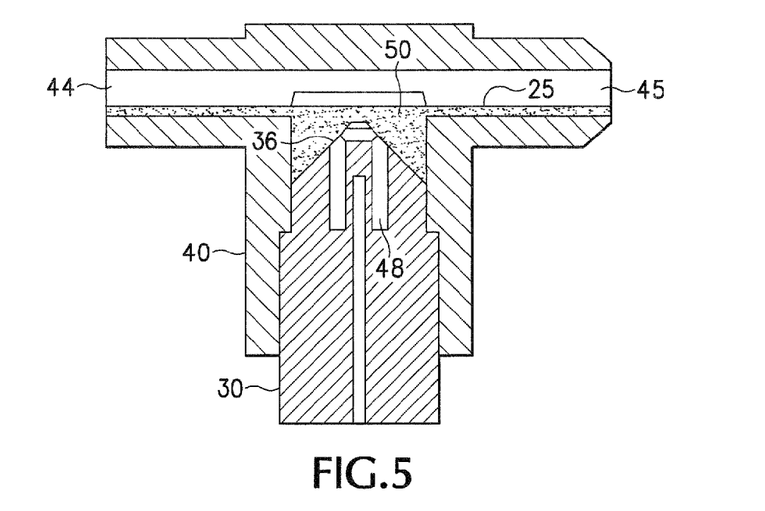
FIG. 5 illustrates a fuel sensor positioned below a reservoir.

FIG. 5 illustrates the fuel sensor 30 positioned below a reservoir 50. The fuel line 35 (FIG. 3A, 3B) or housing 40 may include inlet and outlet ports 44, 45. During operation, the reservoir 50 may contain a pool of liquid fuel. This allows the fuel sensor 30 to be in contact with mainly liquid instead of being exposed to fuel mixtures that have more vapor bubbles than liquid fuel. During idle conditions in particular, the vapor bubble generation in the fuel line 35 may be so much greater than the liquid fuel 25 coming from the fuel tank 20 that the resulting two-phase mixture may erroneously generate a vapor signal. By including the reservoir 50, the denser liquid fuel 25 may settle out to the lowest point in the reservoir 50 while the vapor bubbles pass above this pool off liquid fuel 25. During operation, there will likely be a mix of some vapor bubbles in this pool, but there will be enough liquid present for the fuel sensor 30 to detect the liquid state so that a low fuel warning is not erroneously indicated.

The pool of liquid boils away soon after the internal fuel supply tube 22 (FIGS. 2A, 2B) starts to draw vapor from the fuel tank 20, since there is no new liquid fuel 25 from the tank 20 to replenish the reservoir 50. A higher pressure is required to keep this relatively hotter liquid pool in the reservoir 50 in a liquid state as compared with the system pressure generated by the cooler fuel in the fuel tank 20. The tank temperature and resulting tank pressure start to drop more rapidly when the fuel system begins to draw vapor instead of liquid from the fuel tank 20. The low fuel indicator 6 (FIG. 1) may be triggered when the fuel sensor 30 identifies that the fuel in the reservoir 50 or in the fuel line 35 is in the vapor state.

Figure 6:
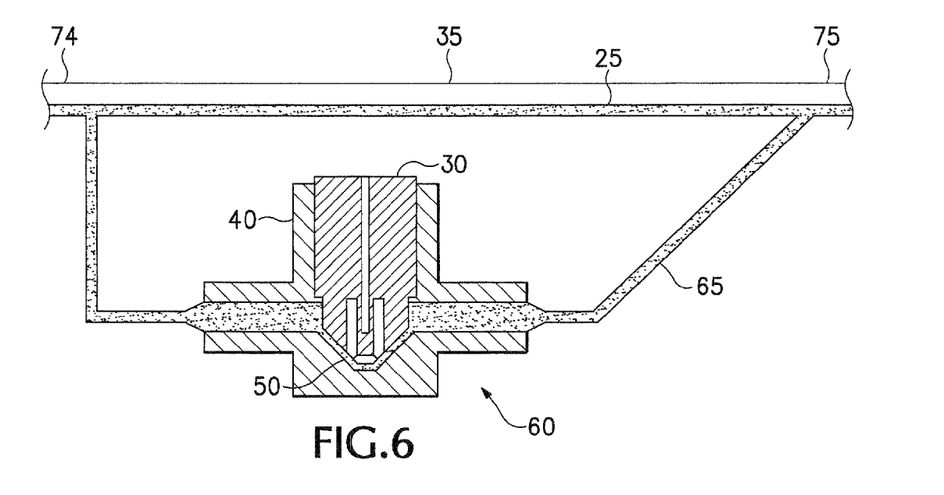
FIG. 6 illustrates a fuel sensor located on an auxiliary fuel line.

FIG. 6 illustrates a fuel sensor 30 located in an auxiliary fuel line 65. In one embodiment, the fuel line 35 may be understood as being the main fuel line. The auxiliary fuel line 65 may be connected to and run at a lower vertical elevation than the fuel line 35. For example, liquid fuel 25 traveling between inlet and outlet ports 74, 75 may be transmitted by the fuel line 35 or the auxiliary fuel line 65, or both lines 35, 65. When the auxiliary fuel line 65 becomes completely full of liquid fuel 25, excess fuel may pass through the fuel line 35, such that liquid fuel 25 may be transmitted by both fuel lines 35, 65. The auxiliary fuel line 65 may allow the denser liquid fuel 25 to pass by or through the fuel sensor 30 while the less dense vapor bubbles pass through the main fuel line 35. During low fuel demands, all the liquid fuel 25 may be transmitted via the auxiliary fuel line 65.

Figure 7:
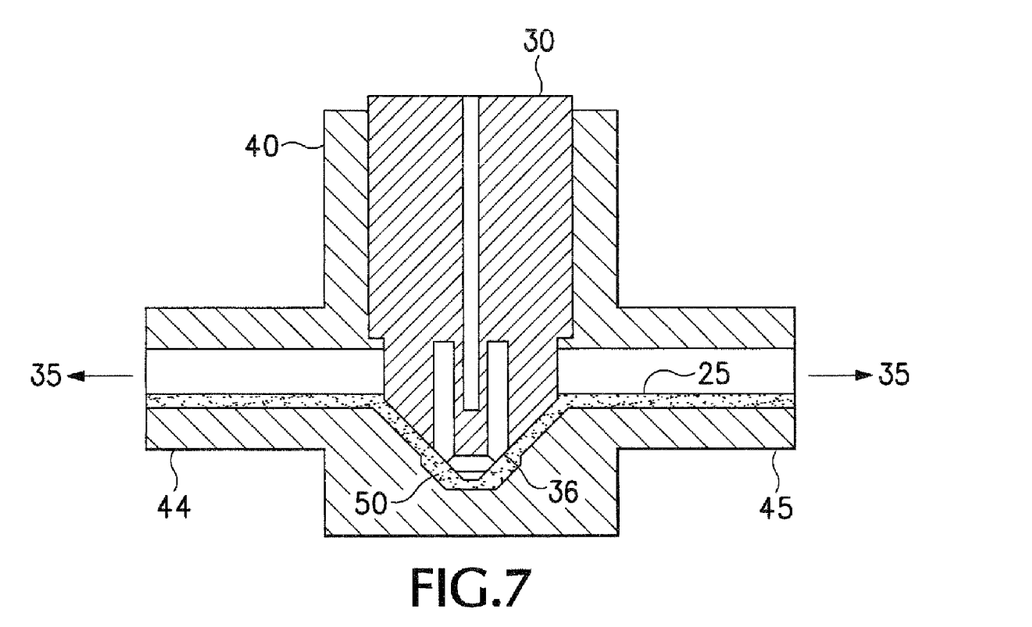
FIG. 7 illustrates a fuel sensor positioned above a reservoir.

FIG. 7 illustrates the fuel sensor 30 positioned above the reservoir 50. The fuel sensor 30 may described as being inverted, as compared with FIG. 5. The housing 40 may be configured or constructed so as to provide or include the reservoir 50. The lens 36 may be positioned such that it remains immersed in a pool of liquid fuel 25 contained in the reservoir 50. Vapor bubbles may be allowed to bypass the sensitive portion of the lens 36, for example in an area of the reservoir 50 that is located above the lens 36. The reservoir 50 may therefore enable separation of the fuel vapor bubbles from the liquid fuel 25. In one embodiment, first port 44 is an outlet port and second port 45 is an inlet port.

Figure 8:
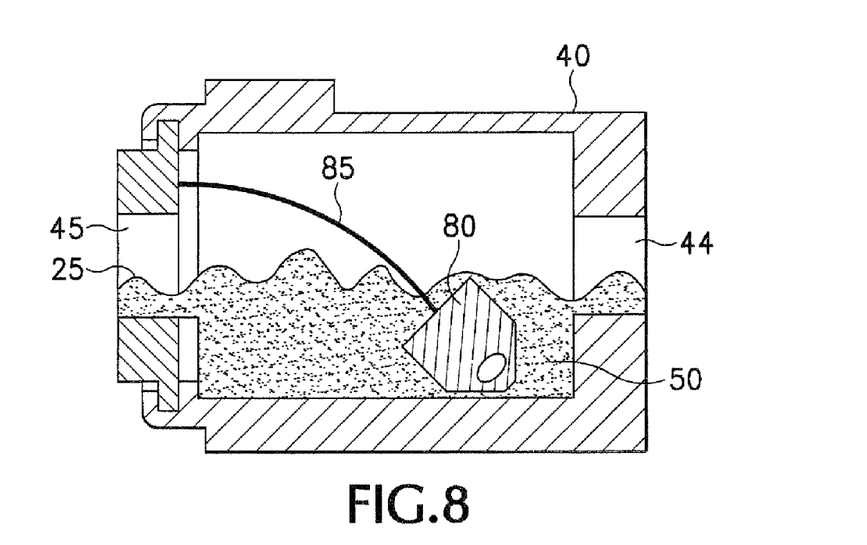
FIG. 8 illustrates an alternate embodiment of a fuel sensor.

FIG. 8 illustrates an alternate embodiment of a fuel sensor 80 attached to a flexible wire 85. The fuel sensor 80 may be unaffected by the mounting orientation of the housing 40 to the fuel line, as the flexible wire 85 allows the fuel sensor 80 to move around freely inside the sensor housing 40. The fuel sensor 80 settles to the bottom of the sensor housing 40 in order to remain below the surface of the liquid fuel 25 in the reservoir 50. The fuel sensor 80 may be configured to operate regardless of the orientation of the housing 40. The inlet and outlet ports 45, 44 may be centered in the ends of the housing 40 so the liquid fuel 25 will pool around the fuel sensor 80. In one embodiment, the fuel sensor 80 is an electro-optic liquid level sensor attached to the flexible wire 85.

FIG. 9 illustrates an algorithm including a sensor sampling time interval for detecting a low fuel condition. During a no-load idle condition, there may not be a continuous flow of liquid fuel 25 to the vaporizer 110 (FIG. 10), but rather an intermittent flow or two-phase combination of liquid and vapor. The primary seat of the LP filter/regulator 14 (FIG. 1) may cycle open and closed during these conditions, for example once every few seconds, instead of being slightly open all the time. In some applications, the time interval of the liquid fuel discharge cycle from the fuel tank 20 may be several seconds (e.g. three to six seconds) with a one to three second liquid discharge duration time.

As previously discussed, vapor bubbles may form in the fuel line 35 during operation of the vehicle, rather than the fuel line 35 always being full of liquid fuel 25. The fuel sensor 30 or controller 200 may provide for an extended sampling time feature having programmable duration (e.g. five seconds) which effectively accommodates this. The sensor sampling time interval feature may be utilized to minimize excess flickering or sounding of the low fuel indicator 6 (FIG. 1) when the liquid level first starts to fall below the fuel pick-up tube inlet 23 (FIGS. 2A, 2B). This feature may also be utilized to command the low fuel indicator 6 to illuminate, sound, remain off, beep or flash after engine start-up. An example of the sensor indicator activation logic is shown in FIG. 9.

The algorithm illustrated by FIG. 9 may be a programmable operation, which may be executed by a microprocessor or controller. In one embodiment, if liquid fuel is present the sensor sampling time interval is not initiated. However, if vapor is present, then the sensor sampling time interval is initiated. If liquid fuel becomes present during a five second period, the sensor sampling time interval will reset and will initiate only when vapor is present again. If vapor is continuous for at least five seconds, the low fuel indicator 6 (e.g. LED) will be activated and remain on for five seconds. The next sensor sampling time interval may be initiated when liquid fuel is again detected, and the cycle repeats as described above.

A minimum latched interval of the low fuel indicator 6 (e.g. five seconds as shown in FIG. 9) may be used to prevent excess flickering. Longer latched periods could reduce the frequency of warning light activation. However shorter intervals may give the operator a better indication of the tank status. For example, if the tank's liquid fuel level is just starting to fall below the pick up tube inlet 23 (FIGS. 2A, 2B), the low fuel indicator light activation may be more intermittent. If the operator notices a steady activation of the low fuel indicator 6, it may indicate that the tank 20 is closer to being empty. In the example shown in FIG. 9, the low fuel indicator 6 never activates for less than five seconds. However, if liquid is detected within the five second period, the low fuel indicator 6 is automatically turned off at the end of the five second interval (see for example condition A at time 10 seconds and condition B at 13 seconds). Significant two-phase conditions or alternating vapor and liquid may not activate the low fuel indicator 6 unless the vapor phase is of at least the minimum threshold duration. For example, in condition C of FIG. 9, the low fuel indicator 6 does not activate until the time indicated at 24 seconds.

Longer sampling times may be beneficial in preventing early activation that may be caused by continuous operation of the vehicle on a sloped surface, or by extended time between flow intervals at idle conditions. If the liquid fuel discharge interval is approximately eight seconds on smaller engine applications, the sensor sampling time interval may need to be greater than five seconds especially if the fuel sensor 30 is located in a section of the fuel line 35 that has a constant vapor pocket.

Auxiliary Fuel Tank System

Figure 10:
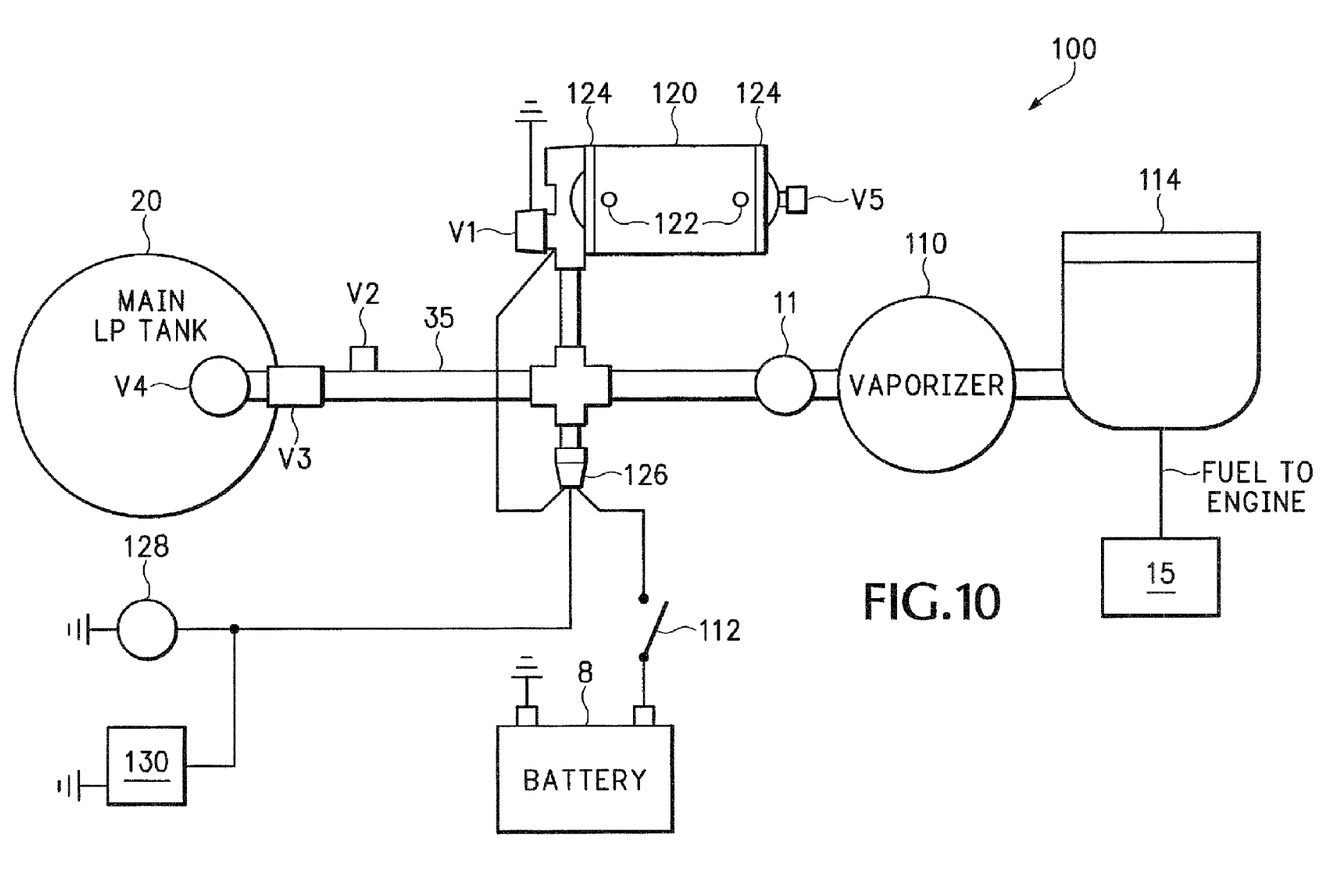
FIG. 10 illustrates an auxiliary fuel tank system.

FIG. 10 illustrates an auxiliary fuel tank system 100 that may be configured to be self filling. The auxiliary fuel tank system 100 includes the fuel tank 20 of FIG. 1, as well as the battery 8 and engine 15. In one embodiment, the fuel tank 20 is understood as being a main fuel tank of a motorized vehicle. The auxiliary fuel tank system 100 further includes an auxiliary fuel tank 120, lockoff 11, vaporizer 110, and LP injector 114. A pressure switch 126 is shown as being connected to the battery 8, low fuel light 128 and low fuel audible alarm 130. A key switch 112 may be provided between the battery 8 and the pressure switch 126. The pressure switch 126 may be used to indicate when the system pressure is less than some predetermined threshold value.

The auxiliary fuel tank 120 is illustrated as including end segments 124, optional engine coolant flow provisions 122, as well as a relief valve V5. A low back-pressure lockoff or checkoff valve V1 may be provided between the auxiliary fuel tank 120 and the fuel line 35. This allows fuel to go into the auxiliary tank 120 when the checkoff valve V1 is in a charged state. When the checkoff valve V1 is in an uncharged state, fuel may be restricted from going out of the auxiliary tank 120. The auxiliary fuel tank system 100 may include a system relief valve V2 as well as a tank valve V3. The auxiliary tank 120 may also include a fuel limiting provision to prevent tank capacity from exceeding more than 80% liquid propane. The checkoff valve V1 may be located at the lowest point in the LP fuel line to ensure that liquid propane enters the auxiliary tank 120 rather than vapor. This configuration may also be configured to accommodate a release of liquid propane from the auxiliary tank 120.

The auxiliary fuel tank system 100 may be configured for forklifts or other internal combustion powered vehicles that provides a useful amount of reserve fuel after the fuel tank 20 runs empty. The auxiliary fuel tank 120 may automatically replenish itself when the fuel tank 20 is refilled or replaced. In one embodiment, a propane vapor sensor, such as the fuel sensor 30 of FIG. 1, triggers the activation of a tank heater 27 (FIG. 1) or activates the auxiliary fuel tank 120 after sensing a pending low fuel condition.

In one embodiment, the auxiliary tank 120 is sized for an approximately 15 minute fuel supply. The low pressure switch 126 may be provided with an initial activation pressure of 20 pounds per square inch (psi) or less. The low pressure switch 126 may be configured to deactivate at a pressure of 30 psi or more. The checkoff valve V1 allows fuel into the auxiliary tank 120 when the checkoff vavle V1 is initially in an uncharged position. The checkoff valve V1 allows fuel from the auxiliary tank 120 to be released into the fuel supply system when the checkoff valve V1 is in the electrically charged position. The auxiliary tank 120 may be tee'd into the fuel line 35 upstream of the main fuel supply lockoff 112.

The low pressure switch 126 may be activated when liquid fuel is boiled off in the main tank 20 and the supply vapor pressure is low. The checkoff valve V1 is then energized and the liquid fuel from the auxiliary tank 120 is dumped into the fuel line 35 until the fuel supply pressure increases enough to deactivate the pressure switch 126 and close the checkoff valve V1. The low fuel warning light 128 and audible alarm 130 may be connected to the same circuit as the checkoff valve V1, thus warning the operator of the low fuel condition. This cycle continues until the auxiliary tank 120 runs out of fuel or the truck is turned off for refueling. When the fuel tank 20 is refilled or exchanged and the main tank valve V4 is opened, the auxiliary tank 120 recharges until it is full. The auxiliary tank 120 remains full until the low pressure switch 126 is activated and turns on the checkoff valve V1 again and the cycle repeats itself.

Figure 11:
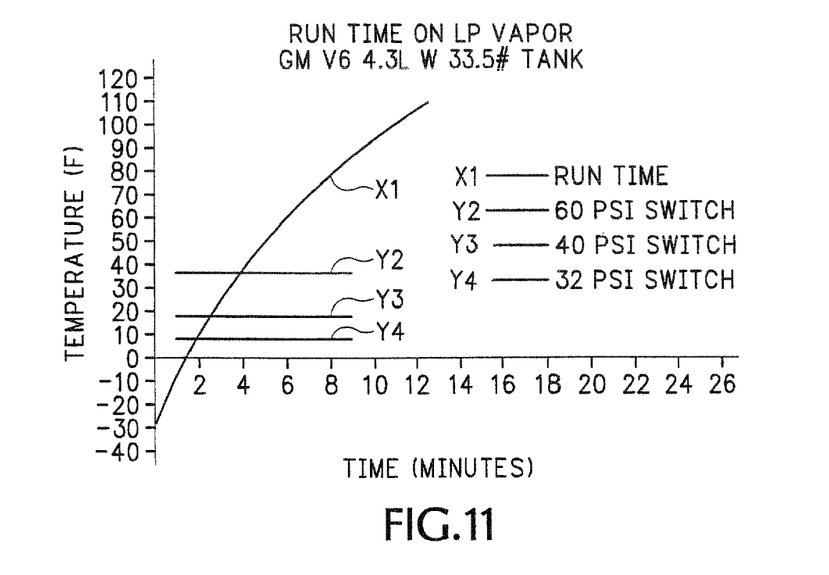
FIG. 11 illustrates a relationship of vehicle run time estimations, vapor pressure and ambient temperature of a liquid propane fuel system.

FIG. 11 illustrates a relationship of vehicle run time estimations, vapor pressure and ambient temperature of a liquid propane fuel system. The graph demonstrates how monitoring LP fuel level based on vapor pressure cannot provide a consistent or adequate warning time over a wide temperature span due to the varying propane vapor pressure. However, if the fuel reserve system is instead based on liquid LP instead of propane vapor the effect of temperature on run time would no longer be a significant factor.

Figure 11A:
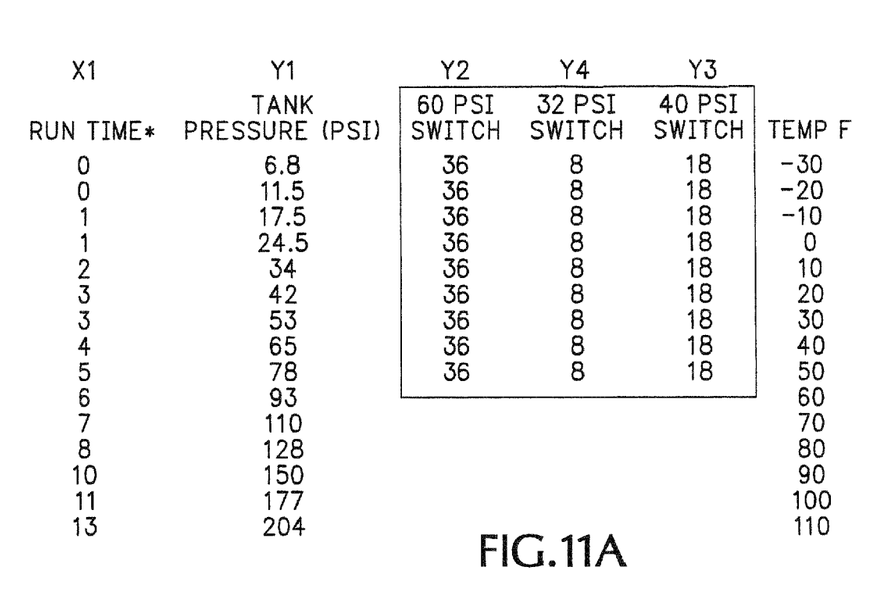
FIG. 11A is a table illustrating example operating conditions used in the run time estimations of FIG. 11.

The pressure switch 126 (FIG. 10) may be set for 32 psi, to provide approximately two minutes of warning. However, longer low fuel warning times via higher pressure switch settings (e.g. 40 psi and 60 psi) can cause the low fuel light to illuminate regardless of liquid fuel level in cold conditions. By way of example, a conventional low fuel warning light will illuminate if temperature is less than −38° F. and 60 psi switch is used. FIG. 11A is a table illustrating example operating conditions used in the run time estimations of FIG. 11.

The auxiliary tank 120 of FIG. 10 provides a predictable low fuel warning period even during cold weather operation. It may increase the low fuel warning/operation time which allows an operator to complete a task before returning to the refill station. It may also allow the main tank 20 to be completely emptied so no unused fuel is wasted when fuel tanks are exchanged. The audible alarm 130 (FIG. 10) may be incorporated to complement a low fuel warning light 128 to ensure the operator is aware of a low fuel condition.

The auxiliary fuel tank 120 provides for a longer LP low fuel warning time which allows equipment operators adequate time to finish a job (i.e. a forklift emptying a delivery truck, etc.) and return to the fuel tank exchange station or refueling station before the engine dies. Fuel cost savings may be achieved by running the LP fuel exchange tanks until nearly empty instead of returning fuel tanks that are partially full. Productivity may be improved since equipment can be operated longer and with fewer tank changes as compared to methods where the tank is changed out prematurely (based on operator's rough estimates of remaining fuel). Cost savings may be realized by avoiding down time and extra labor associated with arranging to exchange fuel tanks on trucks that run out of fuel away from the refueling station.

Vehicle Performance Limitation System

Engine performance of an LP fueled vehicle can be limited based on a low fuel signal and a timer. By including a vehicle performance limitation system it may encourage operators not to ignore the low fuel warning (which may be done via engine performance limitation) and instead prompt the operator to refuel the fuel tank 20 (FIG. 1).

The following example uses the algorithm previously described with respect to FIG. 9. An indicator light or alarm, such as the low fuel indicator 6 (FIG. 1) or 128 (FIG. 10), may indicate a low fuel condition. Once vapor is detected the sensor, such as the fuel sensor 30 (FIG. 1) looks for a five second steady vapor signal. The low fuel indicator 6 remains off until the fuel sensor 30 detects steady vapor for five seconds. The fuel sensor 30 will look for a five second steady vapor condition again. If steady, the low fuel indicator 6 remains on and this cycle repeats. If not, the low fuel indicator 6 goes out.

After a five minute steady low fuel sensor signal, the engine performance may be limited to a first engine speed. For example, the first engine speed may be set at 1800 revolutions per minute (RPM). In one embodiment, the low fuel indicator 6 is commanded to flash or sound on and off at alternating one second intervals. After a ten minute steady low fuel sensor signal, the engine performance may be limited to a second engine speed less than the first. For example the second engine speed may be set at a maximum value of 1200 RPM. The low fuel indicator 6 may be commanded to flash or sound on and off at alternating one half second intervals. Engine speeds and time intervals may be programmable.

The low fuel indicator 6 may be provided in a vehicle dash, or provided as part of an aftermarket system. It may also be used for activating an audible alarm on Aftermarket or Original Equipment Manufacturer (OEM) systems. To avoid operator disablement of the low fuel indicator 6, if the engine 15 is turned off during either of the five minute or ten minute intervals, the system memory may accommodate restart at the timing cycle where it stopped. The cycle may be reset if the fuel sensor 30 no longer provides a steady signal, such as when the fuel tank 20 is being refueled. If the vehicle was shut down during either of the five minute or ten minute intervals, upon restart, the system may wait for short period of time (e.g. seven seconds) before looking for a low fuel input signal. If a low fuel signal occurs within seven seconds after start up, the system timer may need to start at the same place it was stopped. If not, the entire cycle may be repeated.

In one embodiment, the engine performance may be reduced by 50% after some period of time (e.g. five minutes) after a low fuel warning condition is identified. An idle performance (creep speed) of the engine may be commanded some ten minutes after a low fuel warning condition was identified. This encourages the operator to go refuel the truck before the engine stalls due to lack of fuel.

The vehicle performance limitation system may be configured to pick up engine speed via inductance from a spark plug wire and control a valve in the fuel line 35 that is either plumbed into the system or integrated into the fuel sensor 30 itself. Since this valve is only operational during the vapor mode, engine speed control problems associated with liquid fuel droplets boiling off vapor in an uncontrolled fashion are eliminated.

Figure 12:
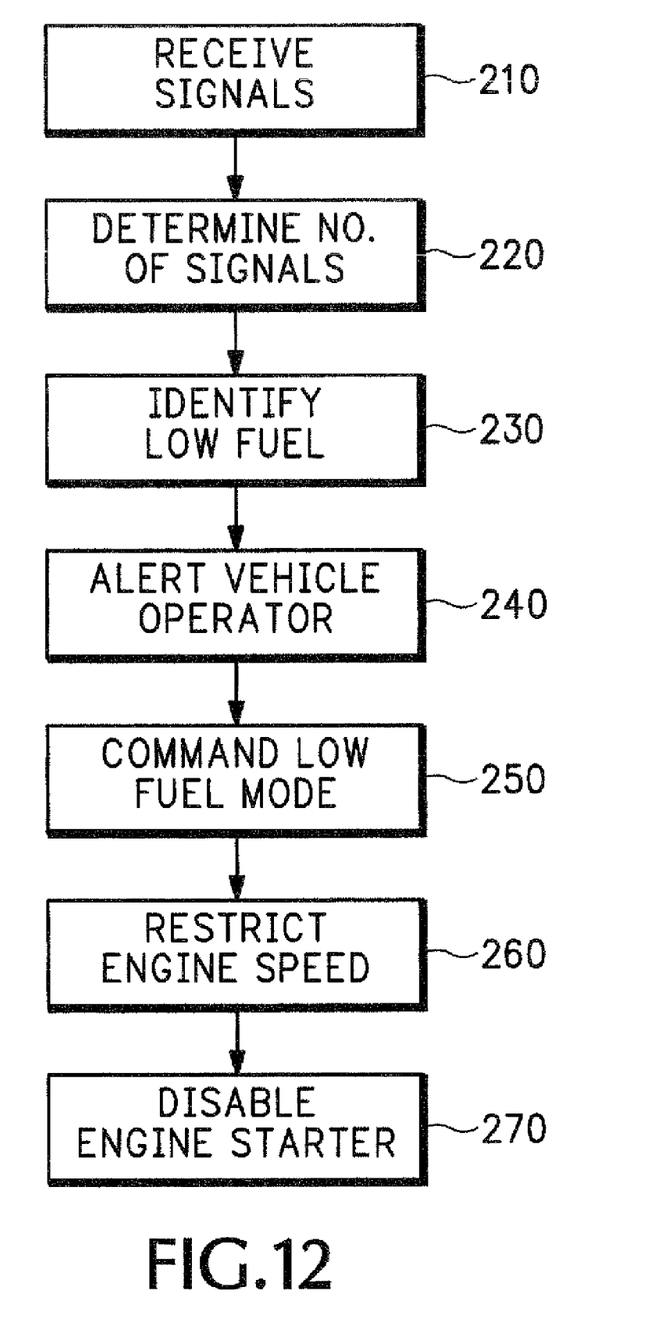
FIG. 12 illustrates a example method of monitoring a low fuel condition.

FIG. 12 illustrates a example method of monitoring a low fuel condition in a motorized vehicle. The method may be performed by a microprocessor, computer, processor or the controller 200 shown in FIG. 1. At operation 210, signals are received from a fuel sensor, such as fuel sensor 30 of FIG. 1. The signals may indicate the presence of a vapor, a liquid, or a two-phase combination of vapor and liquid in a fuel line.

At operation 220, the number of signals received from the fuel sensor 30 is determined. The number of signals may be used by an algorithm, as described with respect to FIG. 9 for example, and including a sensor sampling time interval.

At operation 230, the low fuel condition is identified when the number of received signals exceeds a threshold value. In one embodiment, the low fuel condition is identified when a number of signals is received that correspond to a five second period of time.

At operation 240, a vehicle operator is alerted to the low fuel condition. The operator may be alerted via a low fuel indicator light or audible alarm.

At operation 250, a low fuel mode of operation of the motorized vehicle is commanded. The low fuel condition may indicate the presence of a fuel vapor in a fuel line. In one embodiment, a low fuel control valve may operate to control the fuel vapor only during the low fuel mode of operation.

At operation 260, an engine speed of the motorized vehicle is restricted to a maximum operational value in the low fuel mode of operation. At operation 270, an engine starter is disabled when the low fuel mode of operation is completed.

In one embodiment, the weight of the fuel tank 20 mounted to an industrial vehicle is compared to the weight of an empty fuel tank in order to determine the amount of remaining fuel in the fuel tank 20. The weight may be determined by a sensor, for example. A low fuel condition may be identified when weight of the fuel tank 20 approaches the weight of an empty fuel tank.

In another embodiment, a temperature differential between a liquid and gaseous (ambient) section of the fuel tank 20 is measured to determine a fuel level. For example, an upper sensor, or first thermistor, may be located near the top of the fuel tank 20, and a lower sensor, or second thermistor, may be located near the bottom of the fuel tank 20. In one embodiment, the lower sensor is located at approximately 10% of the full tank level. The two sensors may be attached to a tank clamp. A low fuel condition may be identified when the temperature differential approaches zero or some other threshold value, or when the upper and lower sensors detect the same value.

The fuel sensor 30, 80 may be used for other types of fuel besides propane. Other fuel sensor types and vapor/liquid detection systems and methods may be used with the systems and method described herein. The sensors may include: ultrasonic, acoustic, catalytic, thermal, optical, infrared, photoelectric, electrochemical, mechanical, tank temperature differential, semiconductor, vibrating, di-electric constant, and flow velocity comparisons of the fuel.

The system and apparatus described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A propane fuel sensor comprising:
   a signal generating apparatus that generates a signal in an effective signal path to detect a presence of propane fuel in a fuel line, wherein the propane fuel sensor is mounted to the fuel line intermediate an inlet port and an outlet port of the fuel line;
   a fuel trap comprising:
      a first cross-section area configured to trap liquid propane fuel as the propane fuel is transmitted through the fuel line and past the signal generating apparatus, wherein the propane fuel enters the fuel trap via the inlet port, and wherein the propane fuel leaves the fuel trap via the outlet port; and
      a second cross-section area configured to concentrate the liquid propane fuel transmitted past the signal generating apparatus, wherein the second cross-section area is smaller than the first cross-section area; and
   a housing containing the signal generating apparatus and the effective signal path, wherein the housing is in contact with the propane fuel passing through the fuel trap and past the housing for detection by the effective signal path.

2. The propane fuel sensor according to claim 1, wherein the fuel trap is located at least partially below the inlet port to separate the liquid propane fuel from fuel vapor passing through the fuel line.

3. The propane fuel sensor according to claim 1, wherein the fuel trap is located in a secondary fuel line connected to the inlet port and the outlet port, and wherein the secondary fuel line runs substantially parallel with the fuel line.

4. The propane fuel sensor according to claim 1, wherein the signal generating apparatus is located at least partially below the fuel trap.

5. The propane fuel sensor according to claim 1, further comprising a flexible attachment attached to the housing such that the signal generating apparatus is configured to move within the fuel trap due to gravity.

6. The propane fuel sensor according to claim 5, wherein the fuel trap is located within the housing.

7. The propane fuel sensor according to claim 1, wherein the second cross-section area provides a restrictive gap that concentrates the liquid propane fuel next to the signal generating apparatus.

8. The propane fuel sensor according to claim 1, further comprising a processor, wherein the processor is configured to monitor a low fuel condition for a motorized vehicle according to information received from the propane fuel sensor, wherein the low fuel condition indicates that fuel vapor is being drawn into the fuel line, and wherein the motorized vehicle substantially operates on the fuel vapor when the low fuel condition is indicated.

9. A propane fuel system of a motorized vehicle comprising:
a first portion of a fuel line comprising a first cross-section area;
a second portion of the fuel line located intermediate a propane fuel tank and a propane engine, wherein the second portion of the fuel line comprises a second cross-section area smaller than the first cross-section area to form a restrictive gap;
a fuel sensor located adjacent the restrictive gap and configured to detect propane fuel as it passes through the restrictive gap, wherein the restrictive gap is configured to concentrate liquid propane fuel passing by the fuel sensor; and
a processor in communication with the fuel sensor, wherein the processor is configured to monitor a low fuel condition in the propane fuel system according to information received from the fuel sensor, wherein the low fuel condition indicates that fuel vapor is being drawn into the fuel line, and wherein the motorized vehicle substantially operates on the fuel vapor when the low fuel condition is indicated.

10. The propane fuel system according to claim 9, wherein the fuel sensor comprises an emitter and a receiver, wherein the emitter is configured to transmit one or more signals to the receiver, and wherein the information received from the fuel sensor corresponds with the one or more signals.

11. The propane fuel system according to claim 10, wherein the processor identifies the low fuel condition according to a number of the one or more signals received by the receiver during a predetermined time period.

12. The propane fuel system according to claim 9, wherein the fuel sensor is located in a cooler portion of the fuel line that promotes a formation of the liquid propane fuel, and wherein the cooler portion of the fuel line is located remotely from a fuel vaporizer.

13. The propane fuel system according to claim 9, further comprising a fuel sensor housing connected to the fuel line, wherein the fuel sensor comprises a lens portion that is configured to contact the liquid propane fuel until the low fuel condition develops, and wherein the restrictive gap is located between the lens portion and the fuel sensor housing.

14. The propane fuel system according to claim 13, wherein the lens portion is located adjacent the restrictive gap where a maximum flow restriction of the propane fuel occurs.

15. The propane fuel system according to claim 9, further comprising:
an inlet port of the fuel line located between the restrictive gap and the propane fuel tank; and
an outlet port of the fuel line located between the restrictive gap and the propane engine, wherein the outlet port is oriented in an approximately vertical orientation, and wherein the inlet port is oriented in an approximately horizontal orientation to facilitate venting the fuel vapor from the inlet port and draining liquid droplets through the outlet port.

16. The propane fuel sensor according to claim 9, wherein the propane fuel is transmitted through the fuel line due to a pressure created in the propane fuel tank from a conversion of the liquid propane fuel to the fuel vapor.

17. A method, comprising:
receiving signals from a propane fuel sensor located in a portion of a fuel line intermediate a propane fuel tank and a propane engine, wherein the portion of the fuel line comprises a fuel trap configured to trap liquid propane fuel passing through the fuel line, wherein the propane fuel sensor comprises a lens portion that is located adjacent the fuel trap to concentrate the liquid propane fuel passing by the propane fuel sensor until a low fuel condition develops, wherein the fuel line is located within a motorized vehicle, and wherein the propane fuel sensor is in contact with propane fuel passing through the fuel trap;
determining a number of the signals received from the propane fuel sensor;
identifying the low fuel condition when the number of the signals received from the propane fuel sensor exceeds a threshold value;
alerting a vehicle operator of the low fuel condition; and
commanding a low fuel mode of operation of the motorized vehicle, wherein the propane engine substantially operates on fuel vapor in the low fuel mode of operation.

18. The method according to claim 17, further comprising restricting an engine speed of the motorized vehicle to a maximum operational value in the low fuel mode of operation.

19. The method according to claim 17, wherein the low fuel condition indicates a presence of the fuel vapor in the fuel line.

20. The method according to claim 17, wherein the low fuel condition is identified when a predetermined uninterrupted consecutive number of the signals are received.

21. The method according to claim 17, wherein the low fuel condition is identified when a predetermined pattern of the signals is detected.

22. The method according to claim 17, wherein the lens portion forms a restrictive gap in the fuel trap that concentrates the liquid propane fuel passing by the propane fuel sensor.

23. A motorized vehicle comprising:
a liquid propane gas (LPG) fuel tank;
an LPG engine;
a fuel line configured to transport propane fuel from the LPG fuel tank to the LPG engine;
a fuel trap located in the fuel line, wherein the fuel trap is configured to maintain a pool of liquid propane fuel as the propane fuel is transported through the fuel line;
a signal generating apparatus located at least partially within the pool of liquid propane fuel and configured to detect the propane fuel in the fuel trap, wherein the signal generating apparatus comprises a lens portion that is configured to concentrate the liquid propane fuel passing by the signal generating apparatus until a low fuel condition develops; and
a processor in communication with the signal generating apparatus, wherein the processor is configured to monitor the low fuel condition in a propane fuel system according to information received from the signal generating apparatus, wherein the low fuel condition indicates that fuel vapor is being drawn into the fuel line, and wherein the LPG engine substantially operates on the fuel vapor when the low fuel condition is indicated.

24. The motorized vehicle according to claim 23, further comprising a feed tube located inside of the LPG fuel tank, wherein the fuel vapor is drawn into the fuel line when a level of the liquid fuel drops below the feed tube, and wherein the liquid fuel below the feed tube is converted into the fuel vapor for continued operation of the LPG engine.

25. The motorized vehicle according to claim 23, wherein both the liquid propane fuel and the fuel vapor are forced into the fuel line due to vapor pressure created in the LPG fuel tank.

26. The motorized vehicle according to claim 23, wherein the LPG fuel tank is removable from the motorized vehicle, and wherein the signal generating apparatus remains on the motorized vehicle after the LPG fuel tank is removed.

27. The motorized vehicle according to claim 23, wherein the LPG engine is configured to operate on the fuel vapor for at least five minutes after the low fuel condition is indicated.

28. The motorized vehicle according to claim 23, wherein the lens portion is positioned at least partially within the fuel trap to form a restrictive gap that concentrates the liquid propane fuel passing by the signal generating apparatus.

* * * * *

UNITED STATES PATENT AND TRADEMARK OFFICE
CERTIFICATE OF CORRECTION

Page 1 of 1

PATENT NO. : 7,940,165 B1
APPLICATION NO. : 11/842923
DATED : May 10, 2011
INVENTOR(S) : Lonnie R. Oxley et al.

It is certified that error appears in the above-identified patent and that said Letters Patent is hereby corrected as shown below:

Column 14, line 8 (Claim 16):   Delete "sensor" and insert -- system --.

Signed and Sealed this
Thirteenth Day of November, 2012

David J. Kappos
*Director of the United States Patent and Trademark Office*